(12) United States Patent
Yamatari et al.

(10) Patent No.: US 6,356,916 B1
(45) Date of Patent: Mar. 12, 2002

(54) REPLICA SYSTEM AND METHOD OF PRODUCING A REPLICA

(75) Inventors: Mitsuyoshi Yamatari; Kouichi Yamada; Noriko Ichikawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/346,925

(22) Filed: Jul. 2, 1999

(30) Foreign Application Priority Data

Jan. 13, 1999 (JP) .............................. 11-006115

(51) Int. Cl.[7] .............................................. G06F 12/00
(52) U.S. Cl. ........................ 707/201; 707/202; 707/203; 707/204; 709/230; 714/2; 714/6; 714/12; 714/15; 714/16; 714/19; 714/20
(58) Field of Search ................. 709/230; 707/201–204; 714/2, 6, 12, 15, 16, 19, 20

(56) References Cited

U.S. PATENT DOCUMENTS 5,257,369 A * 10/1993 Skeen et al. ................ 395/650
5,339,392 A * 8/1994 Risberg et al. ............. 395/161
5,956,489 A * 9/1999 San Andres et al. ..... 395/200.51
6,317,754 B1 * 11/2001 Peng .......................... 707/203

* cited by examiner

*Primary Examiner*—Hosain T. Alam
*Assistant Examiner*—Cam Y Truong
(74) *Attorney, Agent, or Firm*—Leydig, Voit, & Mayer, Ltd.

(57) ABSTRACT

A replica system and a method of producing a replica are provided for dealing with a database management system including both database programs and files. The system transmits and receives data between interfaces using a common data format, by including a replica manager which receives a replica instruction and determines an object to be read from a master database and an object to be written in a copy database, according to the replica instruction. By giving a command to the database management system, data associated with the object to be read is read from the database, and data format is converted into a standard data format. The received data is then converted to data format associated with the object to be written, and the converted data is finally stored in the copy database.

11 Claims, 17 Drawing Sheets

| PATTERN NUMBER | MASTER | | | COPY | | | OPTIONAL | |
|---|---|---|---|---|---|---|---|---|
| | PUBLISHER DRIVER NAME | TABLE/ FILE | OBJECT DATA | DESCRIPTOR DRIVER NAME | TABLE/ FILE | OBJECT DATA | CODE CONVERSION | OBJECT KEY |
| 1 | PUBLISHER DRIVER FOR DBMSA | TBLA1 | CODE ITEM NUMBER PRICE | DESCRIPTOR DRIVER FOR DBMSC | TBLB1 | CODE ITEM NUMBER PRICE | X'5050' = X'4A4A' | 1, 5, 15, 20, 25 |
| 2 | PUBLISHER DRIVER FOR DBMSA | TBLA1 | CODE ITEM NUMBER PRICE | DESCRIPTOR DRIVER FOR FILE A | FILE A | CODE ITEM NUMBER PRICE | | |

| <DESCRIPTOR DRIVER> | ADDRESS | AUTHENTI-CATION | OPTIONAL | | |
|---|---|---|---|---|---|
| | | | COMPRES-SION | ENCRYPTION | |
| DESCRIPTOR DRIVER FOR DBMSC | A | AA | | 0 | |
| DESCRIPTOR DRIVER FOR DBMSD | A | AA | | | |
| DESCRIPTOR DRIVER FOR DBMSE | C | | | | |
| DESCRIPTOR DRIVER FOR FILE A | D | | | | |

FIG. 15

| <PUBLISHER DRIVER> | ADDRESS | AUTHENTI-CATION | OPTIONAL | | |
|---|---|---|---|---|---|
| | | | COMPRES-SION | ENCRYPTION | |
| PUBLISHER DRIVER FOR DBMSA | M | AA | | 0 | |
| PUBLIHSER DRIVER FOR DBMSB | M | AA | | | |

FIG. 16

| <PUBLISHER DRIVER> | ADDRESS | AUTHENTI-CATION | OPTIONAL | | |
|---|---|---|---|---|---|
| | | | COMPRES-SION | ENCRYPTION | |
| PUBLISHER DRIVER FOR DBMSA | M | | | | |

FIG. 17

| <PUBLISHER DRIVER> | ADDRESS | AUTHENTI-CATION | OPTIONAL | | |
|---|---|---|---|---|---|
| | | | COMPRES-SION | ENCRYPTION | |
| PUBLISHER DRIVER FOR DBMSA | M | | | | |

REPLICA SYSTEM AND METHOD OF PRODUCING A REPLICA

BACKGROUND OF THE INVENTION

1. Field of the Invention

The present invention relates to a replica system and a method of producing a replica, by which a replica is produced among different databases and/or files.

2. Description of the Prior Art

Today, many computers are used in decentralized fashion and especially small-size computers are distributed to each department of a workplace. In such an environment, before starting business of the day, data necessary for databases or files of each distributed computer is customarily copied from a master database or master file on a host computer. After closing work of the day, revised data is copied into the host computer so as to update the master database or the master file.

As mobile computing technology has been developed, a user can use a computer outside his or her office, say at a customer's site or an employee's home. For example, when sales people start their operations of the day, they may copy necessary information from a master database or master file on a host computer to databases or files of their mobile computers. At the end of the day, these people transmit sales data and cost data to the host computer for updating the master database or master file on the host computer. This is the most effective method in terms of reduction of communication cost and access time.

Generally, a data exchange method and a system adopting this method are respectively referred to as a method of producing replica(s) and a replica system, in which data is copied between a plurality of databases and files.

FIG. 20 illustrates configuration of an existing replica system. In the figure, a replica system comprises a host computer 1001 and a distributed computer 1002 such as a mobile computer. The host computer 1001 and the distributed computer 1002 are connected together via a communication medium, say a LAN (local area network) or Internet.

The host computer 1001 has a master database A 1003 (master database is hereinafter referred to as "master DB") and a master DB B 1004, and also has a database management system A 1005 (database management system is hereinafter abbreviated to "DBMS") and a DBMS B 1006 for managing each of the master DBs. It should be noted that these DBMS A 1005 and DBMS B 1006 may use either the same type of database programs or a different type of database programs.

The distributed computer 1002 consists of a copy database C 1007 (copy database is hereinafter referred to as "copy DB") and a copy DB D 1008 used for copying necessary data from the master DB A 1003, and consists of a DBMS C 1009 and a DBMS D 1010 which are database management systems for managing each of the copy DBs. DBMS C 1009 and DBMS D 1010 use the same type of database programs which are the same as those used by the DBMS A 1005 of the host computer.

A database replica program 1011 presets the correspondence between the master DBs of the host computer 1001 and the copy DBs of the distributed computer 1002, and controls data copying between databases at user's request. This database replica program 1011 is located in the host computer 1001.

The operation of the database replica program 1011 will be described below.

When the user requests a data copy from the master DB A 1003 to the copy DB C 1007, data is read from the master DB A 1003 via the DBMS A 1005 and written into the copy DB C 1007 via the DBMS C 1009. When the user requests a copy of the updated data from the copy DB C 1007 to the master DB A 1003, the updated data is read from the copy DB C 1007 via the DBMS C 1009. The data is then written into the master DB A 1003 via DBMS A 1005.

Similarly, copying of data is performed between the master DB A 1003 and the copy DB D 1008. However, the updated data in the copy DB D 1008 cannot be copied to the master DB B 1004 as shown in FIG. 20 by a broken line if the DBMSs managing the copy DB D and the master DB B use different types of database programs. Even when the database programs are of the same type, copying is not available unless the correspondence between a copy DB and a master DB exists in the database replica program 1011.

The host computer 1001 has a master file 1012 and a file replica program 1013, while the distributed computer 1002 contains a copy file 1014 which corresponds to the master file 1012.

Correspondence between the master file 1012 on the host computer 1001 and the copy file 1014 of the distributed computer 1002 is preset in the file replica program 1013. The program then controls copying of data between the files at user's request.

Many types of database programs are now available in the market and they are specifically used according to their intended use. For example, a database management system using a database program such as DB2™ by IBM Corporation or Oracle 8™ by Oracle Corporation which are capable of processing many tasks at one time, in parallel, is suitable for a host computer which may be used by many people simultaneously. On the other hand, for computers for private-use, such as a mobile computer, where tasks are sequentially created, a database management system using a database program with less load, say Oracle light™ by Oracle Corporation or Access™ by Microsoft Corporation, is suitable.

However, in the conventional replica system, the database replica program is designed in correspondence with a specific database program. Therefore, the system cannot interface with a database management system Using different types of database programs. Accordingly, a master DB and a copy DB should be managed by a database management system which uses the same types of database programs. Management of this kind prevents a system construction from becoming a flexible one which operates conforming to a load.

When constructing a replica system which produces a replica between databases or between files, two types of program, namely, a database replica program and a file replica program are required. This requirement adds to the load on the system.

Furthermore, the database replica program must have all data necessary for copying, including data in tables of the copy DB and the master DB, thus making the system construction complicated. Particularly, the whole of the database replica program has to be modified each time a data format of the copy DB or copy file is added or converted, which makes the modification procedure very complicated.

In addition, when the user intends to add some additional function, such as a character code conversion, he or she has a difficult task, such as to modify the whole of the database replica program. Addition of such a function is therefore not feasible in actuality.

SUMMARY OF THE INVENTION

The present invention aims to solve the problems mentioned above. It is a primary object of this invention to provide a replica system with a less load, which can deal with a database management system including plural kinds of database programs and can deal with files.

It is another object of the present invention to provide a replica system to which a user can easily add or modify a data format of the copy DB or the copy file, as well as add a function, such as a character code conversion.

According to one aspect of the invention, the objects of the invention are achieved by a replica system having first data storage means, first data management means for managing the first data storage means, second data storage means, and second data management means for managing the second data storage means, wherein replica of data is produced between said first data storage means and said second data storage means; comprising, replica management means for receiving a replica instruction, and, according to the replica instruction, determining an object to be read from said first data storage means and an object to be written in said second data storage means, first interface means, giving a command to said first data management means, for reading from said first data storage means data associated with said object to be read, and converting a format of the data into a standard data format specified in said system, and second interface means for receiving data in the standard data format from said first interface means, converting the format of the data into a data format associated with the object to be written, and writing the data in the converted format into said second data storage means by giving a command to said second data management means.

It is preferable that in the replica system, at least one of said first data storage means and said second data storage means is a database.

It is preferable that in the replica system, at least one of said first data storage means and said second data storage means is a data file.

It is also preferable that in the replica system, the replica management means has replica pattern storage means for storing replica pattern data with information concerning the object to be read and the object to be written.

It is preferable that in the replica system, the replica pattern data includes code conversion information.

According to another aspect of the invention, the objects of the invention are achieved by the replica system, further comprising replica instruction storage means in which the replica instruction is stored, wherein said replica management means reads the replica instruction from said replica instruction storage means.

According to still another aspect of the invention, the objects of the invention are achieved by the replica system, wherein each of said first interface means and second interface means has an interchangeable interface driver.

According to still another aspect of the invention, the objects of the invention are achieved by the replica system, wherein said replica management means has first replica distribution management means for sending data to and receiving data from said first interface means, and has second replica distribution management means for sending data to and receiving data from said second interface means.

According to still another aspect of the invention, the objects of the invention are achieved by the replica system, wherein said first interface means and first replica distribution management means are located on a first computer, and said second interface means and second replica distribution management means are located on a second computer, said first computer and second computer being connectable via a communication medium.

According to still another aspect of the invention, the objects of the invention are achieved by the replica system, wherein said first computer has first communication interface means for managing communication, and said second computer has second communication interface means for managing communication, whereby said first communication interface means may be connected to said second communication interface means in accordance with an instruction sent from said first replica distribution management means, and said second communication interface means may be connected to said first communication interface means in accordance with an instruction sent from said second replica distribution management means.

According to another aspect of the invention, the objects of the invention are achieved by the replica system, wherein said first computer has first communication information storage means for storing communication information used for communication with said second computer, and said second computer has second communication information storage means for storing communication information used for communication with said first computer.

It is preferable that in the present replica system, the communication information is a communication address.

According to a further aspect of the invention, the objects of the invention are achieved by a method of producing replica in a system having first data storage means managed by first data management means and second data storage means managed by second data management means, the method comprising the steps of receiving a replica instruction; determining, according to the replica instruction, an object to be read from said first data storage means and an object to be written in said second data storage means; reading from said first data storage means data associated with the object to be read, by giving a command to said first data management means; converting the data into a standard data format specified in said system; converting the data in the standard data format into data in a format associated with the object to be written; and writing the data in the format associated with the object to be written into said second data storage means, by giving a command to said second data management means.

According to a still further aspect of the invention, the objects of the invention are achieved by a method of producing replica in a system having first data storage means managed by first data management means and second data storage means managed by second data management means, wherein said first data storage means is on a first computer where said first data management means is located, and said second data storage means is on a second computer where said second data management means is located, the method comprising the steps of receiving a replica instruction; determining, according to the replica instruction, an object to be read from said first data storage means and an object to be written in said second data storage means; reading from said first data storage means data associated with the object to be read, by giving a command to said first data management means; converting the data into a standard data format specified in said system; connecting said first computer and second computer via a communication medium; causing said first computer to send the data in the standard data format; causing said second computer to receive the data in the standard data format; converting the data received into a format associated with the object to be written; and writing the data in the format associated with the object to be written into said second data storage means, by giving a command to said second data management means.

BRIEF DESCRIPTION OF THE DRAWINGS

The present invention will become more fully understood by the accompanying drawings which are given by way of illustration only, and thus are not limitative of the present invention, and wherein:

FIG. 2 shows a format of replica pattern data defined in a replica definition table;

FIG. 14 conceptually shows a correspondence table stored in a communication memory disk;

FIG. 15 conceptually shows a correspondence table stored in a communication memory disk;

FIG. 16 conceptually shows a correspondence table stored in a communication memory disk;

FIG. 17 conceptually shows a correspondence table stored in a communication memory disk;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

First Embodiment

Figure 1:
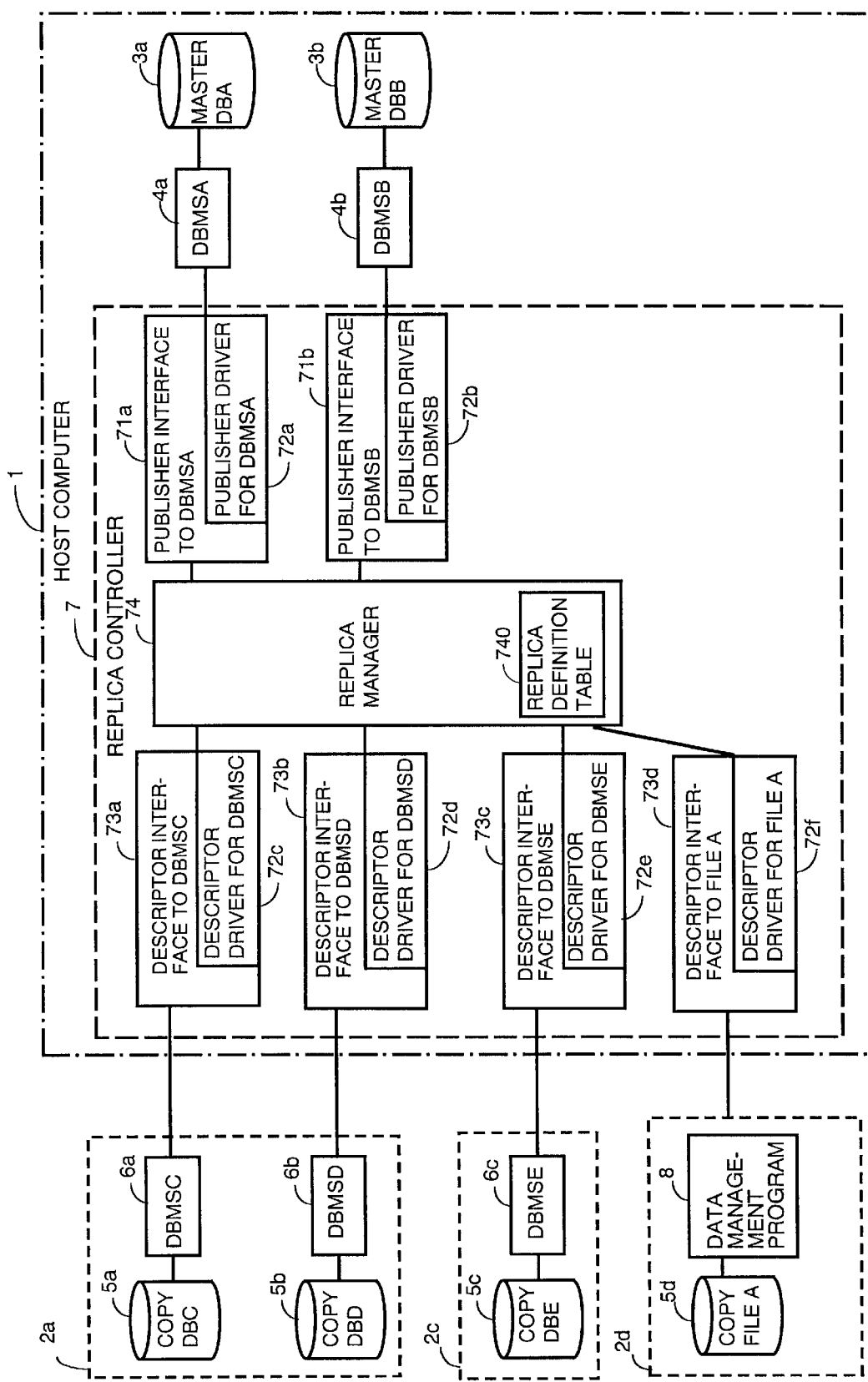
FIG. 1 shows a construction of a replica system according to a first embodiment of the invention.

FIG. 1 is a block diagram illustrating a replica system according to a first embodiment of this invention. As shown in FIG. 1, the replica system comprises a host computer 1, distributed computers 2a, 2c, and 2d, such as mobile computers. The host computer 1 and these distributed computers 2a, 2c and 2d are connected together via a communication media, say a LAN (local area network) or the Internet.

The host computer 1 has a master database A 3a (hereinafter referred to as "master DB"), a database management system A 4a (hereinafter referred to as "DBMS") for managing the master DB A 3a, a master DB B 3b and a DBMS B 4b for managing the master DB B 3b.

The distributed computer 2a has a copy database C 5a (hereinafter referred to as "copy DB") for storing necessary data copied from the master DB A 3a, a DBMS C 6a, which is a database management system for managing the copy DB C 5a, a copy DB D 5b for storing necessary data copied from the master DB B 3b, and a DBMS D 6b, which is a database management system for managing the copy DB D 5b.

The distributed computer 2c has a copy DB E 5c for storing necessary data copied from the master DB A 3a and a DBMS E 6c for managing the copy DB E 5c. The distributed computer 2d has a copy file A 5d which is a data file having necessary data copied from the master DB A 3a, and has a data management program 8. In general, the data management program 8 is incorporated in an operating system.

It should be noted that combinations of the DBMS A 4a and DBMS C 6a, the DBMS B 4b and DBMS D 6b, and the DBMS A 4a and DBMS E 6c may be database management systems which use the same database program or a different database program.

The databases and data files correspond to "a data storage means", while the database management system managing the databases and data files, and the data management program are equivalent to "a data management means".

In FIG. 1, a reference numeral 7 denotes a replica controller which converts data format and controls a data read/write, between the master DB A 3a and the master DB B 3b on the host computer 1 and the copy DB C 5a and the copy DB D 5b on the distributed computer 2a, between the master DB A 3a and the master DB B 3b on the host computer 1 and the copy DB E 5c on the distributed computer 2c, and between the master DB A 3a and the master DB B 3b on the host computer 1 and the copy file A 5d on the distributed computer 2d.

The replica controller 7 comprises a publisher interface to DBMS A 71a as an interface means which provides an interface to DBMS A 4a, a publisher interface to DBMS B 71b as an interface means providing an interface to DBMS B 4b, a descriptor interface to DBMS C 73a as an interface means providing an interface to DBMS C 6a, a descriptor interface to DBMS D 73b as an interface means providing an interface to DBMS D 6b, a descriptor interface to DBMS E 73c as an interface means providing an interface to DBMS E 6c, a descriptor interface to file A 73d as an interface means providing an interface to the data management program 8, and a replica manager 74 as a replica management means.

Note that the publisher interface to DBMS A 71a, the publisher interface to DBMS B 71b, the descriptor interface to DBMS C 73*a*, the descriptor interface to DBMS D 73*b*, the descriptor interface to DBMS E 73*c*, and the descriptor interface to file A 73*d* comprise one or more objects, each of which has an interface driver, namely, a publisher driver for DBMS A 72*a*, a publisher driver for DBMS B 72*b*, a descriptor driver for DBMS C 72*c*, a descriptor driver for DBMS D 72*d*, a descriptor driver for DBMS E 72*e* and a descriptor driver for file A 72*f*. "Publisher" and "descriptor" are mutually named in accordance with the execution of an operation associated with the master side and one associated with the copy side.

The replica manager 74 controls instructions to each publisher interface and each descriptor interface to manage these interfaces, and has a replica definition table 740 as a replica pattern storage means for storing replica pattern data in advance.

FIG. 2 shows a data format of the replica pattern data as defined in the replica definition table 740. In this figure, a reference numeral 7401 denotes a defined replica pattern number, and 7402, a column associated with the master side, consisting of columns for publisher driver name 7403*a*, table/file name 7404*a* and object data name 7405*a*.

Publisher driver names corresponding to the master DB and master file in association with a replica processing are registered in the column for publisher driver name 7403*a*. In the column for table/file name 7404*a*, table names or master file names which are objects in a replica processing, are registered.

The DBMSs have a list of the table names and information concerning the data format of these tables. A series of data manipulations, such as a data read from databases or a data write into databases, can be implemented by specifying the table name and issuing a command to the DBMS. In the column for object data name 7405*a*, names of data, which are an object of producing a replica and are selected from among data contained in the table or file written in the column for table/file name 7404*a*, are registered.

Reference numeral 7406 denotes a column indicating the copy side. Similar to the column 7402 indicating the master side, the column 7406 is divided into columns for descriptor driver name 7403*b*, table/file name 7404*b*, and object data name 7405*b*. Reference numeral 7407 indicates a column for registering optional data specifically set by the system administrator in the replica processing. This column consists of columns for code conversion 7408 and object key 7409. The column for code conversion 7408 contains code conversion information, such as a code conversion of special data residing within object data of the master DB. More specifically, in a case where the user-defined character codes are different between a DBMS which manages the master DB and a DBMS which manages the user DB, the column 7408 registers correspondence between these codes. The column for object key 7409 registers a key associated with data which is an object of producing a replica among object data. The system administrator can optionally add other columns to the column for optional data.

The method of copying necessary data from the master DB to the copy DB and the method of copying updated data from the copy DB to the master DB will be described below by taking the master DB A 3*a* and the copy DB C 5*a*, for example.

Note that these methods follow the pattern designated by the pattern number "1" registered in the replica definition table of FIG. 2.

Figure 3:
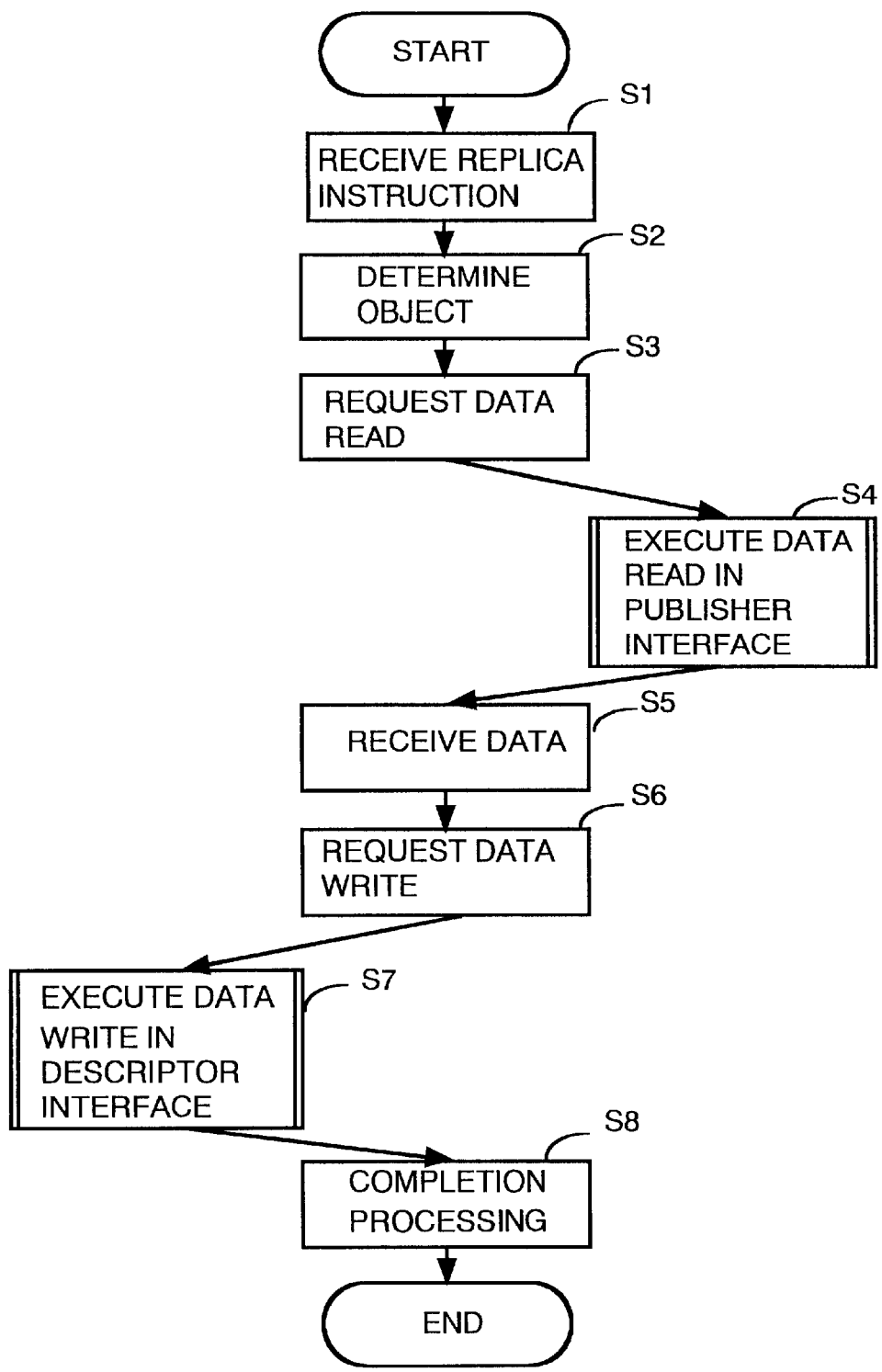
FIG. 3 is a flowchart illustrating the operation of the replica system which copies necessary data from a master DB to a copy DB.
Figure 4:
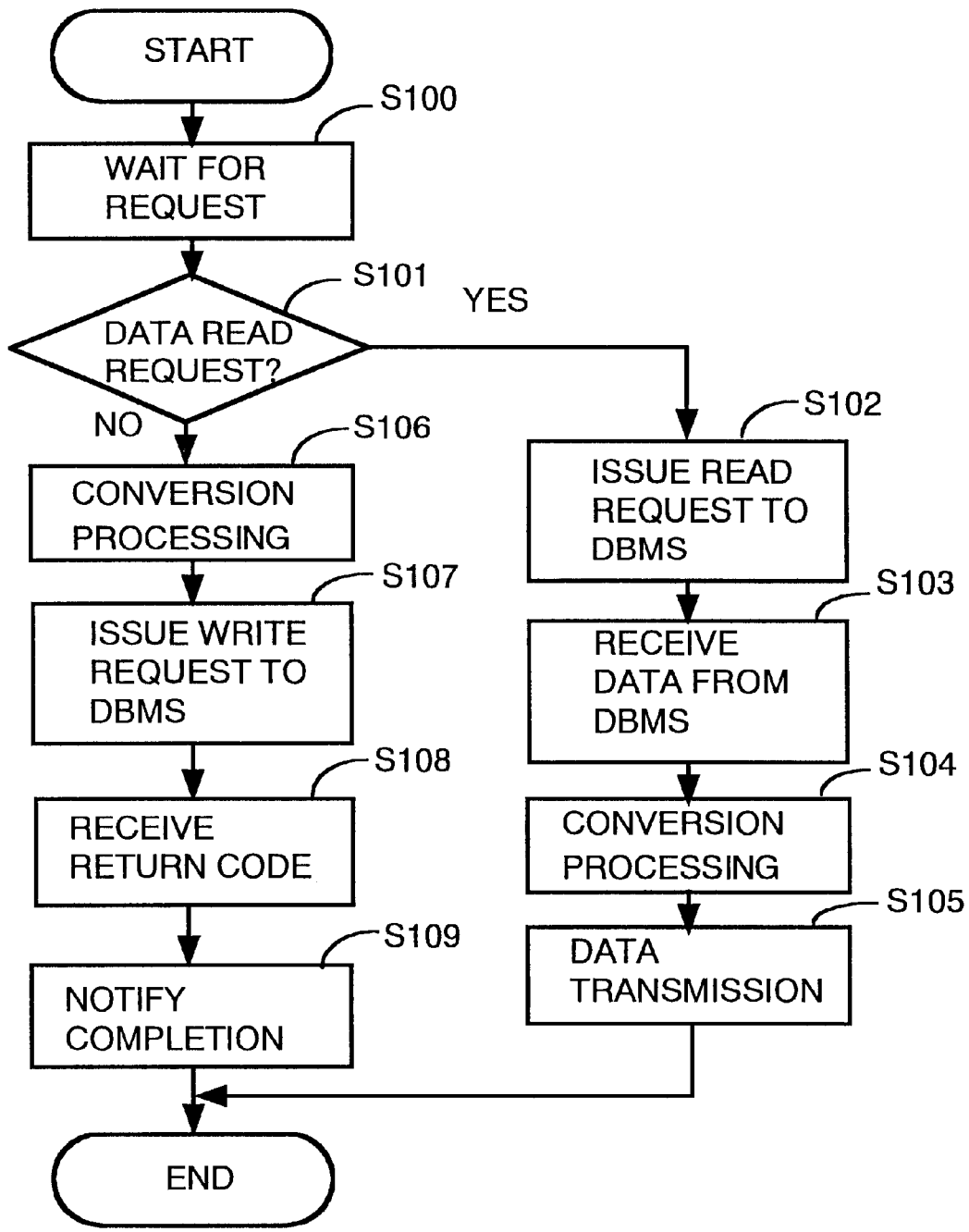
FIG. 4 is a flowchart showing the operation of a publisher interface.
Figure 5:
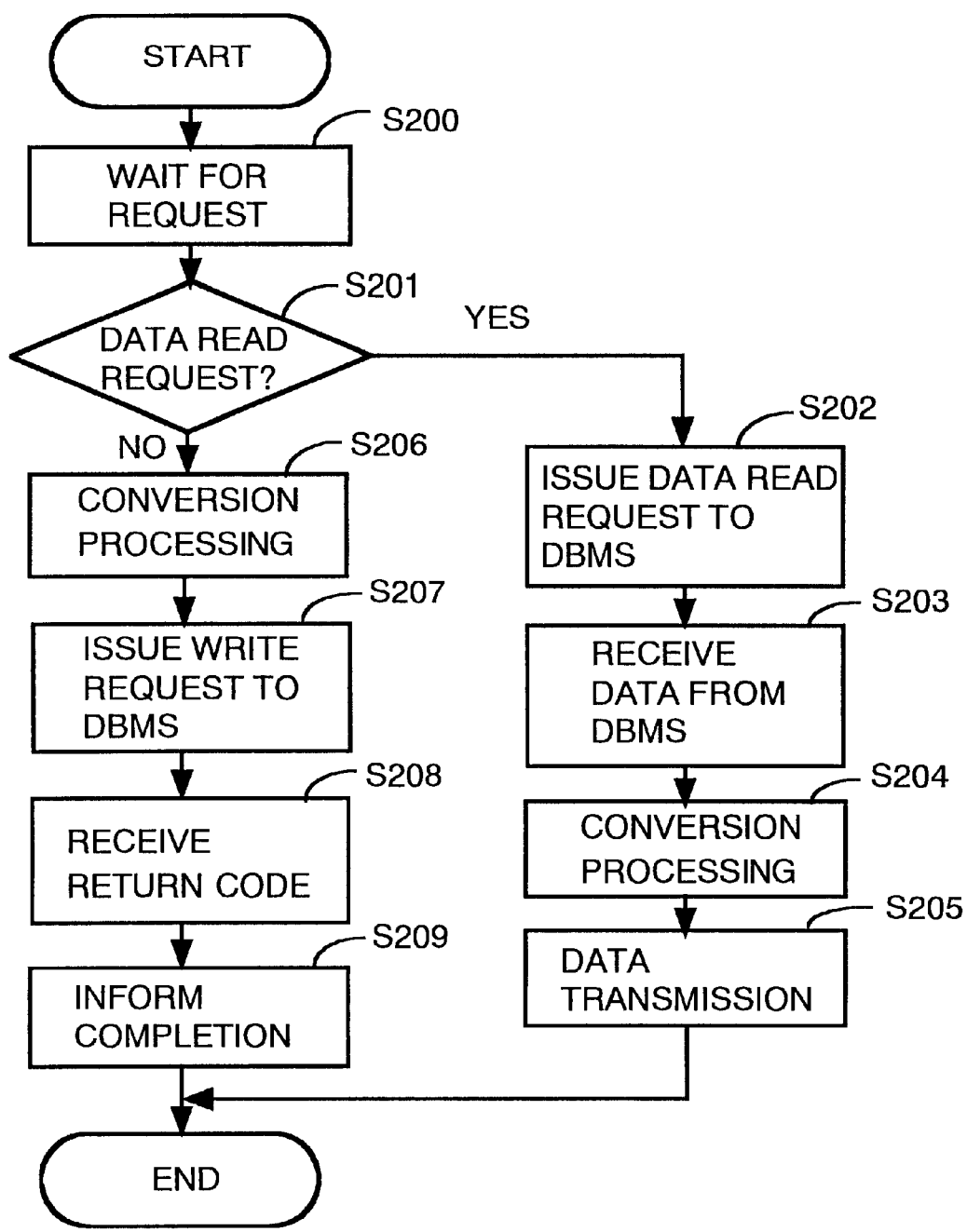
FIG. 5 is a flowchart illustrating the operation of a descriptor interface.

FIG. 3 is a flowchart showing the operation of the replica system in a case where necessary data is copied from the master DB A 3*a* to the copy DB C 5*a*. FIG. 4 is a flowchart illustrating the operation of the publisher interface to DBMS A 71*a* and FIG. 5 is a flowchart showing the operation of the descriptor interface to DBMS C 73*a*.

In the system according to the present embodiment, it is necessary before performing replica processing that the host computer 1 and the distributed computer 2*a* be connected together via a communication line. The connection may be made, for example, by using a method in which a communication driver of the distributed computer 2*a* is activated so as to make a call to the host computer 1, and a session is initiated with a communication driver of the host computer 1. It is assumed here that data transmission between the descriptor interface to DBMS C 73*a* and the DBMS C 6*a* is accomplished via each of their communication drivers.

In the first step, the replica manager 74 receives a replica instruction indicating execution of a data copy from the master side to the copy side, by following the pattern number "1" (step S1 of FIG. 3). This instruction may be input by a sales person via the distributed computer, or by an operator using a console associated with the host computer 1. Upon reception of the instruction, the replica manager 74 determines an object to be written in or to be read out, based on the designation of the replica pattern data registered in the replica definition table 740 (step S2). The object here is a table/file name or the object data. In the next step, a data read request is sent to the publisher interface to DBMS A 71*a* which corresponds to the driver name registered in the column for publisher driver name 7403*a* (step S3).

The data read request accompanies data stored in the column for the master 7402 and data in the column for optional data 7407, associated with the replica pattern data. In the publisher interface to DBMS A 71*a*, the publisher driver for DBMS A 72*a* executes a data read processing (step S4).

Data read processing in the step S4 will be described in detail by referring to the flowchart of FIG. 4. The publisher driver for DBMS A 72*a* is activated simultaneously when the system is started up, and then goes into a state of waiting for a request (step S100). Upon reception of the request from the replica manager 74, the driver determines if the request indicates a data read request or not (step S101).

If the driver 72*a* determines the request as a data read request, the driver issues a statement to the DBMS A 4*a* requesting the data read from the master DB A 3*a*. More specifically, the driver creates and issues a statement for reading only data with CODEs of 1, 5, 15, 20 and 25, since TBLA1 is registered in the column for table name 7404*a*, CODE, ITEM, NUMBER and PRICE data are registered in the column for object data 7405*a*, and values registered in the column for object key 7409 designated to the CODE are 1, 5, 15, 20 and 25 (step S102).

The DBMS A 4*a* reads data from the master DBA 3*a* according to the statement, and sends it to the publisher interface to DBMS A 71*a*. The publisher driver for DBMS A 72*a* receives the data (step S103), converts a format of the data into a standard data format defined in the system, and also performs a code conversion of the special data (step S104).

Conversion to the standard data format means that all data is converted into a byte format. Data is converted into the byte format as follows. In the first step, the driver 72*a* specifies a table name of TBLA1 registered in the column for table name 7404*a* and issues a command of reading the data format of TBLA1 to the DBMS A 4*a*. This processing reveals the data format of TBLA1. Therefore, if the data read is in either a pack format or zone format, the data is converted to the byte format.

Code conversion of the special data indicates conversion of a code registered in the column for code 7408. Specifically, in the example with the pattern number "1", if the ITEM data contains X '5050', it is converted into X '4A4A'. The converted data is then sent to the replica manager 74 (step S105).

The replica manager 74 receives data in a standard data format from the publisher interface to DBMS A 71*a* (step S5), and sends a request to the descriptor interface to DBMS C 73*a* to write data with the data in a standard data format (step S6). In the descriptor interface to DBMS C 73*a*, the descriptor driver for DBMS C 72*c* executes a data write processing (step S7).

The data write processing in step S7 will be described in detail with reference to the flowchart of FIG. 5. Upon start-up of the system, the descriptor driver for DBMS C 72*c* is activated, and then moves to a state of waiting for a request (step S200). When the descriptor driver for DBMS C 72*c* receives the request from the replica manager 74, the driver determines whether the request is a data read request or not (step S201). If it is determined that the request is the data read request, the driver initially converts the received data from a standard data format into a data format associated with the copy DB C 5*a*.

More specifically, the driver in the first step designates a table name of the TBLB1 registered in the column for table name 7404*b* and issues a command to the DBMS C 6*a* to read a data format of the TBLB1. If the data format of the TBLB1 is proved, the driver then converts each data with a standard data format, namely, CODE, ITEM, NUMBER and PRICE data in a byte format which has been sent from the replica manager 74, into data with a data format of TBLB1 (step S206). Then, the driver creates a statement for writing the converted data and issues it to the DBMS C 6*a* (step S207).

The DBMS C 6*a* writes the data into the copy DB C 5*a* according to the statement, and sends a return code back to the descriptor interface to DBMS C 73*a*. The descriptor driver for DBMS C 72*c* receives the return code (step S208), and informs the replica manager 74 of completion of processing (step S209). The replica manager 74 receives the completion information and executes a series of completion processes, such as sending completion information to the user (step S8).

Figure 6:
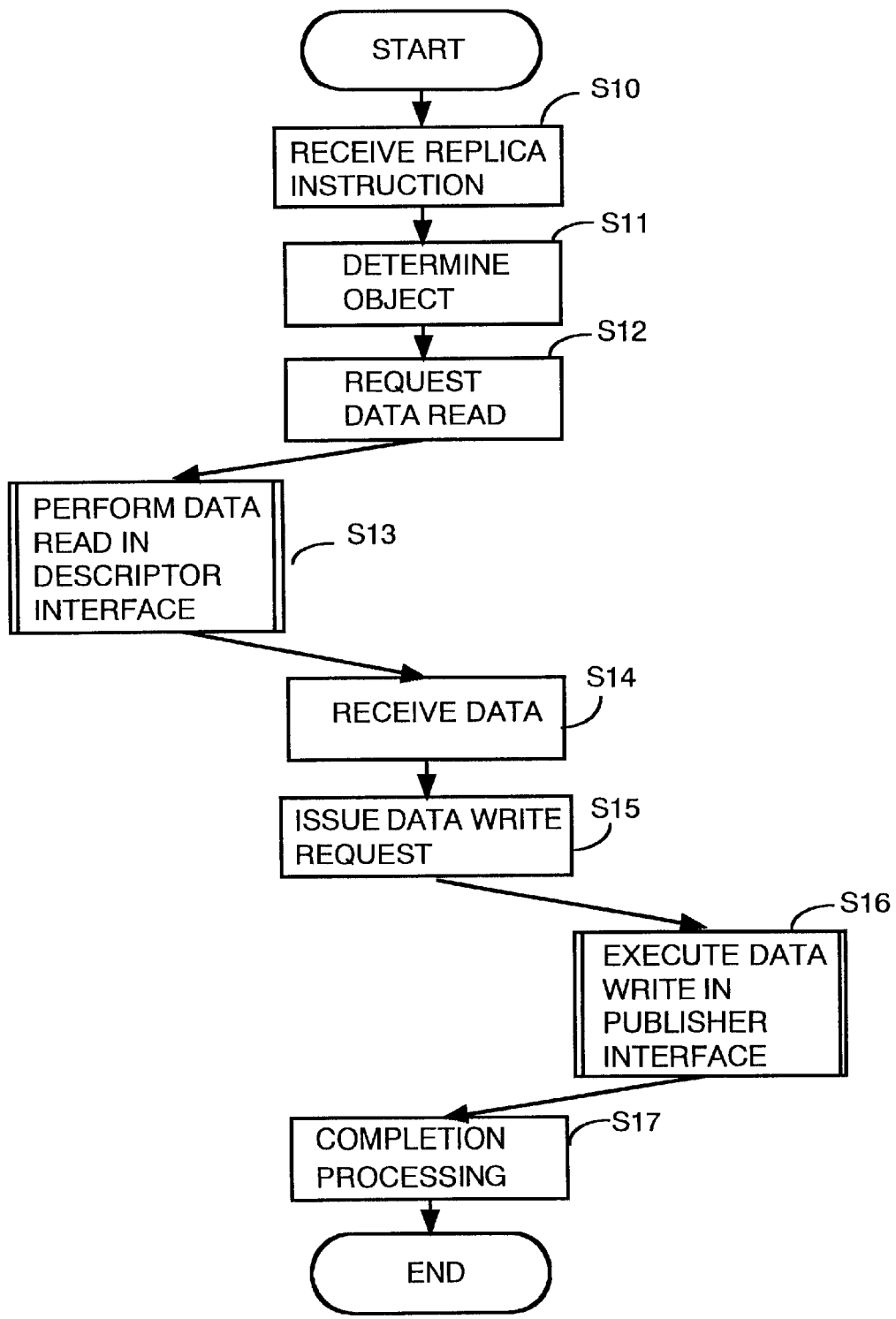
FIG. 6 is a flowchart depicting the operation of the replica system which takes out updated data from the copy DB to reflect it on the master DB.

The operation of reflecting the updated data in the copy DB C 5*a* on the master DB A 3 will be described below. It is assumed that the system of the present embodiment follows the pattern number "1" as shown in FIG. 2. FIG. 6 illustrates a sequence of the operations of the replica manager when reading the updated data from the copy DB and writing it into the master DB.

The replica manager 74 receives a replica instruction to copy the updated data from the copy side to the master side according to the pattern number "1" (step S10). The replica manager then reads the replica pattern data from the replica definition table 740 to determine an object to be read and to be written (Step S11).

After the determination, the manager sends a data read request to the descriptor interface to DBMS C 73*a* which corresponds to the driver name registered in the column for descriptor driver name 7403*b* (Step S12).

The data read request accompanies data stored in the column for the master 7402 and in the column for optionals 7407 of the replica definition table 740. In the descriptor interface to DBMS C 73*a*, the descriptor driver for DBMS C 72*c* is activated to perform a data read processing (step S13).

Detailed operation of the data read processing in step S13 in the descriptor interface to DBMS C 73*a* will be described below with reference to a flowchart of FIG. 5. As mentioned above, the descriptor driver for DBMS C 72*c* is activated simultaneously when the system is started up, and goes into a state of waiting for a request (step S200). When the descriptor driver receives the request from the replica manager 74, the driver determines if the request is a data read request or not (step S201).

If it is determined that the request is the data read request, the driver issues a statement to the DBMS C 6*a* to read the updated data from the copy DB C 5*a* (step S202). Data to be read is selected based on the registration in the replica definition table and on the update time managed by the DBMS C. Specifically, an object of data reading should be associated with TBLB1 registered in the column for table name 7404*b*, with CODE, ITEM, NUMBER and PRICE data registered in the object data column 7405*b* in the table, with data whose CODE values registered in the object key column 7409 are values of 1, 5, 15, 20 and 25, and with data having a updated date which indicates the date after executing a copy processing from the master DBA3*a* to the copy DBC 5*a*. Note that the DBMS C 6*a* manages the updated date of data.

The DBMS C 6*a* reads data from the copy DB C 5*a* according to the statement, and sends it to the descriptor interface to DBMS C 73*a*. The descriptor driver for DBMS C 72*c* receives the data (step S203), converts it into the one with a standard data format, and then performs a code conversion of the special data (step S204). The data is therefore sent to the replica manager 74 (step S205).

The replica manager 74 receives data in the standard data format from the descriptor interface to DBMS C 73*a* (step S14), and issues a data write request together with data in the standard data format to the publisher interface to DBMS A 71*a* (step S15). The driver for DBMS A 72*a* in the publisher interface to DBMS A 71*a* then executes a data write processing (step S16).

The data write processing in the step S16 will be described in detail by referring to a flowchart of FIG. 4. The publisher driver for DBMS A 72*a* is activated as mentioned above at the start-up of the system, and moves to a state of waiting for a request (step S100). When the publisher driver receives the request from the replica manager 74, the driver determines whether the request is a write request or not (step S101). If it is the write request, the driver converts the received data in the standard data format into data in a format associated with the master DB A 3*a*. More specifically, the publisher driver designates a table name of TBLA1 registered in the column for table 7404*a*, and issues a command to read the data format of the TBLA1 to the DBMS A 6*a*. The driver converts CODE, ITEM, NUMBER and PRICE data sent from the replica manager 74, in the standard data format, that is, in a byte format, into the data format of the TBLA1 on the master DB 3*a* (step S106). The driver then creates a statement for writing data and issues it to the DBMS A 4*a* (step S107).

The DBMS A 4*a* writes the data into the master DB A 3*a* according to the statement, and sends a return code to the publisher interface to DBMS A 71*a*. The publisher driver for DBMS A 72*a* receives the return code (step S108), and gives notification of completion of processing to the replica manager 74 (step S109).

The replica manager 74 receives the completion notification and executes a series of completion processes, such as a report to the user with the end of processing (step S17).

In such a replica system, even when the number of the master DBs or copy DBs is increased or the databases are changed, production of a replica can be easily implemented by simply adding and/or updating a corresponding descriptor interface to DBMS and by registering replica patterns in the replica definition table, regardless of a program used in a database management system which manages these added or changed databases. Therefore, no change is required in the replica manager, and in other descriptor interfaces to DBMS and publisher interfaces to DBMS. Accordingly, the user can easily modify the program.

The user can also determine the type of the replica processing without paying attention to the type of a database program used in the database management system which manages the master DB and copy DB. Furthermore, in a case where the user uses special characters, a character code conversion at the time of replica processing is easily performed by simply registering, in advance, information concerning the character code conversion in the replica definition table.

Note that when the replica processing is performed between the master DB A 3a and the copy file A 5d, by following, for example, a pattern number "2" registered in the replica definition table of FIG. 2, processing implemented in the descriptor driver for file A 72f at the side of the descriptor interface to file A 73d is slightly different from the one described above.

The descriptor driver for file A 72f in the descriptor interface to file A 73d needs to internally incorporate a data format of the copy file A 5d. When the descriptor driver receives a data read request from the replica manager 74, the driver designates a file name, creates a data read command and issues the command to the distributed computer 2d. The data management program 8 incorporated in the operating system of the distributed computer 2d then receives the data read command and reads specified data from the copy file A.

Accordingly, since it is capable of reading data from the copy file A 5d, the descriptor driver for file A 72f selects necessary data based on the data format of the copy file A 5d which is internally incorporated in this driver and on the information registered in the replica definition table 740. The driver then converts the selected data into the standard data format, and sends the converted data to the replica manager 74.

On the contrary, when the descriptor driver receives from the replica manager 74 a data write request together with data, the driver converts the data into data with a data format of the copy file A, and specifies a file name to issue a data write instruction to the distributed computer 2d. Therefore, the data management program 8 in the distributed computer 2d executes writing of the data into the copy file A 5d.

It should be noted that in a case where a replica processing is implemented using the master file, the publisher driver at the master file side will suffice to have the same processing function as that in the descriptor driver for the file A 72f. With such a function, a single system can implement copying of data between the master DB and the copy file, copying of data between the master file and the copy DB and copying of data between the master file and the copy file.

Furthermore, an arrangement may be adopted in which each descriptor interface is arranged on each distributed computer rather than on the host computer.

With the above arrangement, if there is a change in the copy DB and the copy file, the user can deal with that change by simply modifying the distributed computer that has the copy DB and copy file, which requires no modification of the host computer. Therefore, time and job required for such modification can be reduced.

It is also appreciated that each driver may have information in a table format of the database, and the replica definition table may store information in a table format of the database or a table format of the file. In such a configuration, the descriptor driver and the publisher driver may be relieved from the task that a format of each table is examined by issuing a command to each database management system.

In the present embodiment, all of the data is converted into data with a byte format as a standard format. However, as far as the format is concerned, the present invention does not impose a limit on a byte format. Data to be exchanged between the publisher interface and the descriptor interface via the replica manager is required to have the same data format, irrespective of which of a publisher interface and which of a descriptor interface pertain to the data transmission.

In the present embodiment, master DBs are located in the host computer, while copy DBs are deployed for the distributed computer. However, an arrangement may be adopted in which both master DBs and copy DBs can be located in a single computer, provided that the system comprises master DBs and copy DBs.

Second Embodiment

Figure 7:
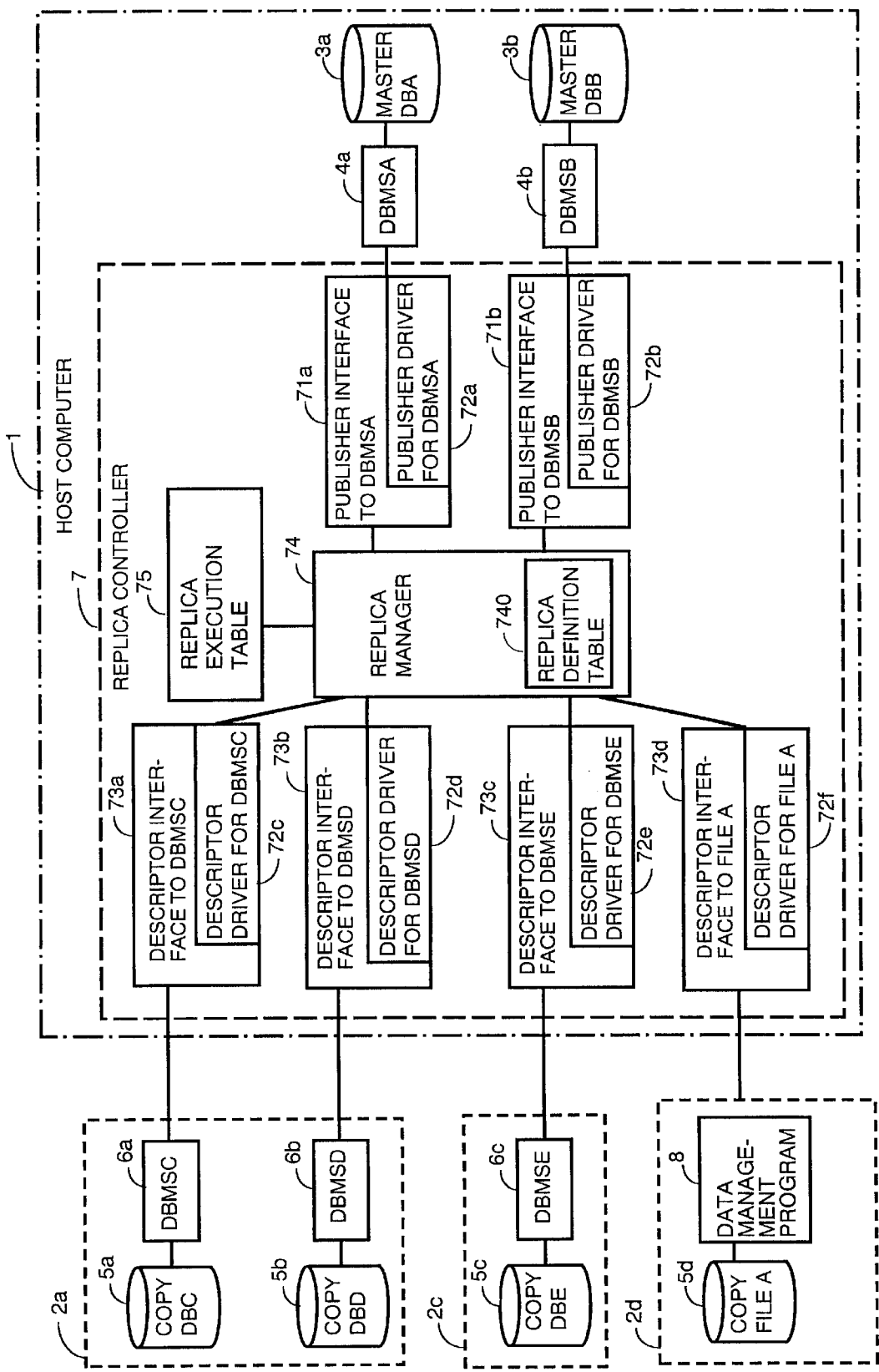
FIG. 7 is a block diagram illustrating a replica system according to a second embodiment of the invention.

FIG. 7 is a block diagram showing a replica system according to a second embodiment of the present invention. The system according to the present embodiment additionally has a replica execution table in the replica controller 7, compared to the replica system according to the first embodiment as shown in FIG. 1.

In FIG. 7, a reference numeral 75 denotes the replica execution table as a replica instruction storage means, which is used to register, in advance, replica instructions as data. The replica instructions include instructions to copy from the master DB to the copy DB, or to copy updated data from the copy DB to the master DB.

Figure 8:
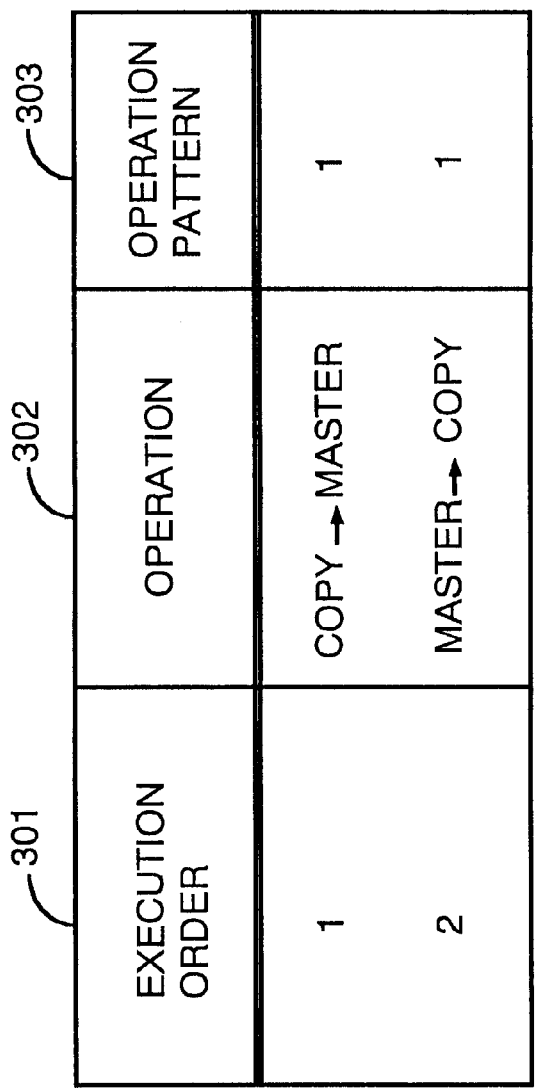
FIG. 8 shows a list of data registered in a replica execution table.

FIG. 8 is a table representing data registered in the replica execution table. In FIG. 8, a column 301 is for storing numbers indicating an execution order, 302, a column for registering directions of a copy operation, i.e., a copy from the master side to the copy side, or a copy from the copy side to the master side, and 303, a column for operation pattern having pattern numbers stored in the replica definition table 740.

Figure 9:
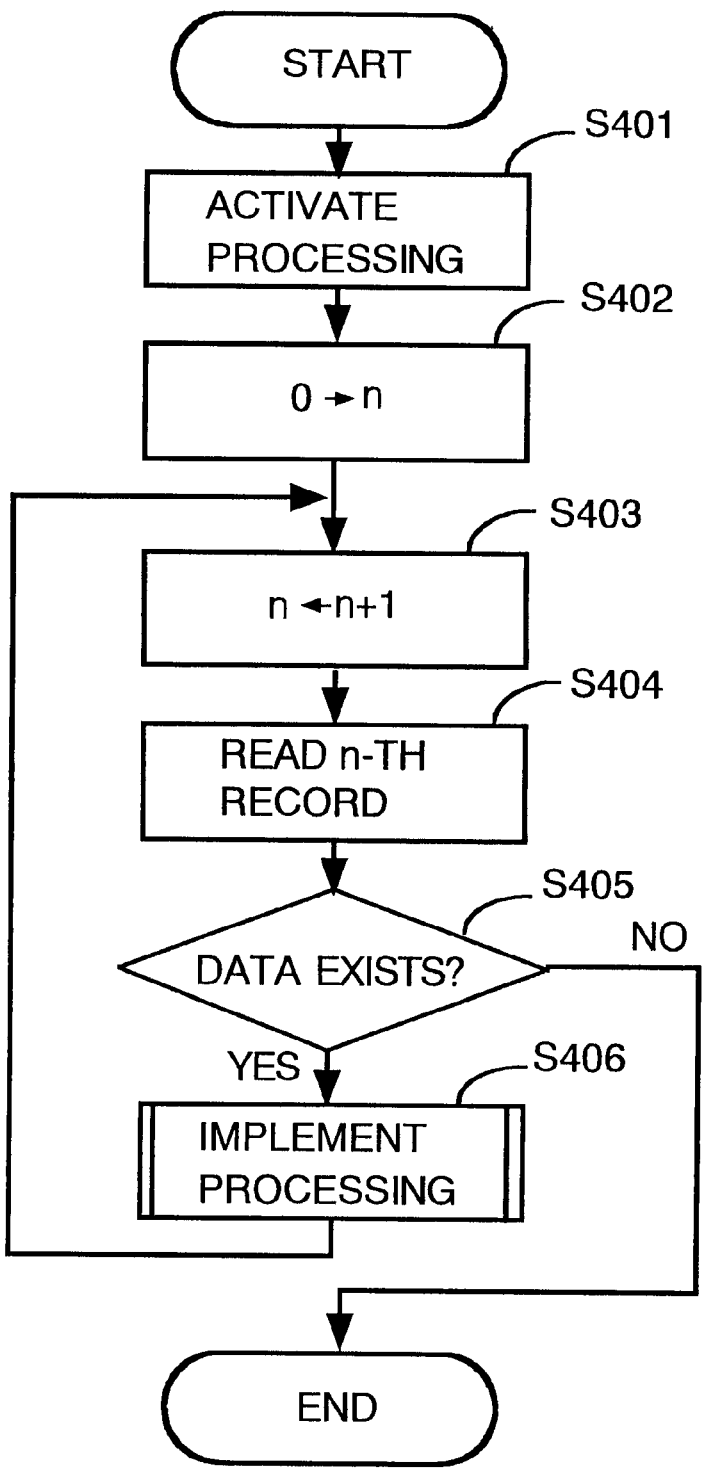
FIG. 9 is a flowchart showing an operation using the replica execution table.

Operation using the replica execution table will be described below with reference to a flowchart shown in FIG. 9. In the first step, processing based on the replica execution table 75 is activated (step S401). The processing may be activated by a command input by an administrator using a console, or may be started at a predetermined time. After being activated, processing to initialize a counter n is performed (step S402), the counter n is incremented by 1 (step S403), and n-th record indicative of n-th line is read from the replica execution table 75 (step S404). If it is determined that data exists, that is, if YES is rendered in step S405, a replica instruction indicated by the data is performed (step S406). More specifically, in a case where data with an execution order of "1" as shown in FIG. 8 is read, a corresponding operation in the column 302 shows a copy from the copy side to the master side and an operation pattern in the column 303 is "1". This means that copying processing from the copy DB to the master DB as shown in FIG. 6 is executed. The processing then returns to step S403 to perform ensuing steps. If it is determined no data is read in step S405, the processing will be terminated.

Registration of necessary replica instructions in advance, as mentioned above, significantly reduces the administrator's labor, as opposed to a manual input of replica instructions for each operation. This kind of registration is especially effective to routine processing where replica instructions can be used repeatedly once they are written in the replica execution table.

In the present embodiment, an execution order is registered in advance, in the replica execution table. However, the time to execute replica instead of the execution order may be registered. In this case, the replica manager may have a function of monitoring the execution time registered in the replica execution table, and executing the replica processing at that execution time. Such an arrangement is effective, especially when executing unmanned replica processing.

Third Embodiment

Figure 10:
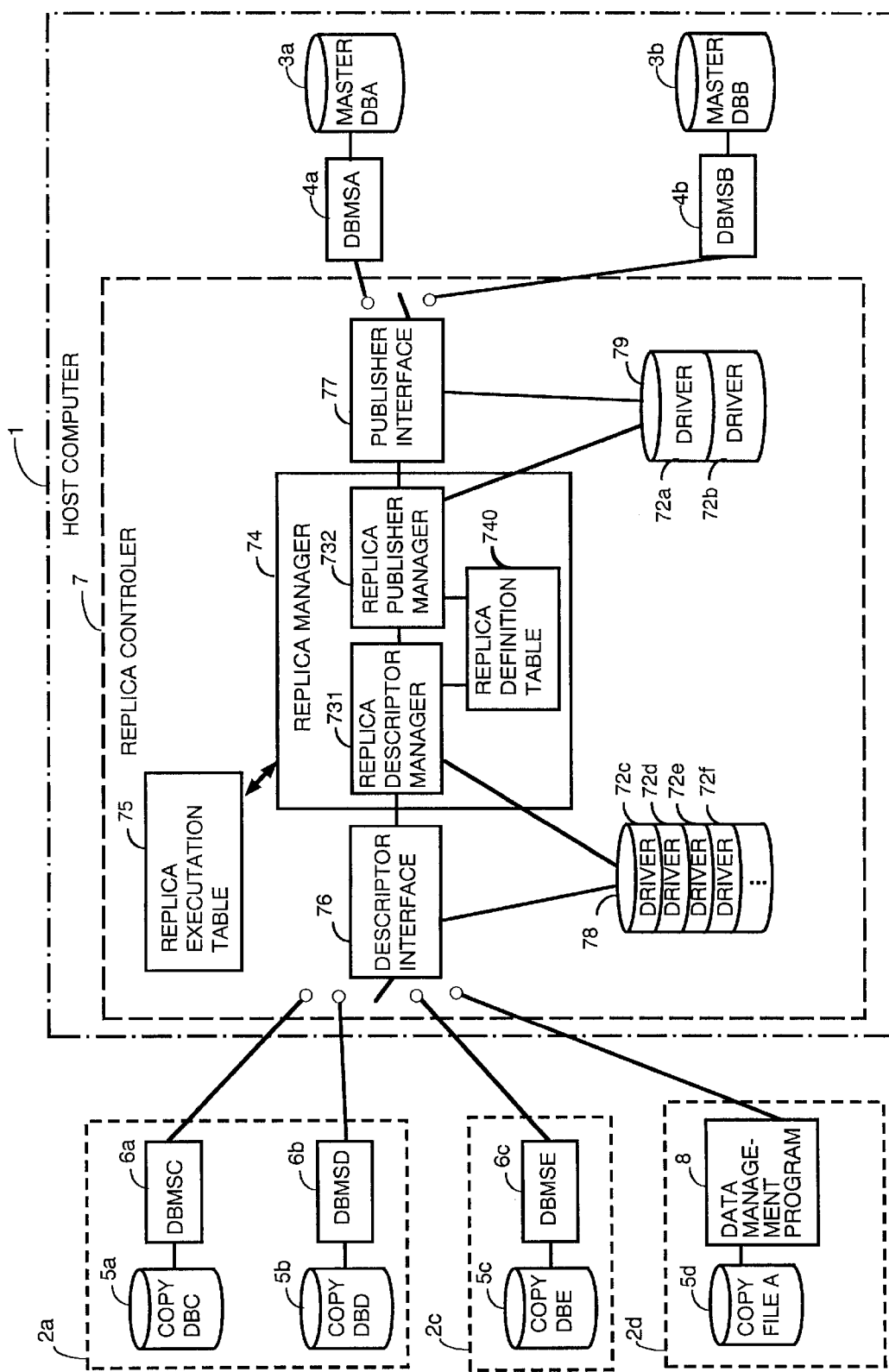
FIG. 10 is a block diagram illustrating a replica system according to a third embodiment of the invention.

FIG. 10 is a block diagram illustrating a replica system according to a third embodiment of the present invention. In this system, descriptor drivers and publisher drivers are read from a disk as needed, for these drivers to be operated.

Publisher interface 77 and a descriptor interface 76 respectively comprise one or more objects, and are controlled by internal publisher drivers and internal descriptor drivers. The system has a configuration which creates objects for only a common part having an interface to the replica manager 74 and an interface to the database management system, then loads necessary publisher drivers and descriptor drivers each time a request from the replica manager is received, thus combining these drivers to operate.

In FIG. 10, a descriptor driver storage disk 78 stores descriptor drivers for managing the copy DBs and the copy file on the distributed computers. More specifically, the disk stores a descriptor driver for DBMS C 72c, a descriptor driver for DBMS D 72d, a descriptor driver for DBMS E 72e, and a descriptor driver for file A 72f. Publisher driver storage disk 79 stores publisher drivers for managing the master DBs and master files on the host computer. Concretely, the disk stores a publisher driver for DBMS A 72a and a publisher driver for DBMS B 72b.

Replica descriptor manager 731 and a replica publisher manager 732, both of which act as a replica distribution management means, are located in the replica manager 74, and manage the descriptor interface 76 and the publisher interface 77, respectively.

Operation which is requested by an execution order "1" described in the replica execution table of FIG. 8, that is, copy processing of updated data from the copy DB to the master DB in accordance with the operation pattern "1", will now be described below with reference to a flowchart of FIG. 11.

The replica publisher manager 732 initially reads a record registered in the replica execution table 75, and examines contents of the record (step S501). In this case, the contents show copy processing from the master side to the copy side conforming to the pattern number "1" in the replica definition table 740. The manager then reads replica pattern data corresponding to the pattern number "1" in the replica definition table 740 to determine objects to be read and to be written (step S502).

In the next step, the replica publisher manager 732 instructs the replica descriptor manager 731 to read the updated data from the copy DB C 5a. The replica descriptor manager 731 determines a necessary descriptor driver based on the replica pattern data, and loads the descriptor driver for DBMS C 72c as a driver for the DBMS C 6a which manages the copy DB C 5a, from the descriptor driver storage disk 78 to the descriptor interface 76 (step S503).

If the replica descriptor manager 731 issues a data read request to the descriptor interface 76 (step S504), processing of step S13 is executed in a similar manner as in the sequences shown in FIGS. 5 and 6, thus receiving updated data of the copy DB 5a (step S505).

The replica descriptor manager 731 then delivers the received data to the replica publisher manager 732. The replica publisher manager 732 determines a necessary publisher driver according to the replica pattern data, and loads the publisher driver for DBMS A 72a as a driver for the DBMS A 4a which manages the master DB A 3a, from the publisher driver storage disk 79 to the publisher interface 77 (step S506). After the replica publisher manager 732 issues a data write instruction to the publisher interface 77 (step S507), steps S16 and S17 are executed in a similar manner as in the sequences shown in FIG. 6. Consequently, the updated data is reflected in the master DB A 3a.

Note that in a case where data is written to or read from the copy DB D 5b, the copy DB E 5c and the copy file A 5d, a descriptor driver corresponding to each of the DBMSs or a file should be loaded to the descriptor manager interface 76. In the case of writing or reading data to and from the master DB B 3b, it is only necessary to load the publisher driver for DBMS B 72b to the publisher interface 77.

In such a configuration, only a single interface is required to provide an interface to DBMSs which manage the master DB and copy DB, and to provide an interface to the master files and copy files. This configuration provides an inexpensive replica system with a simpler construction, as opposed to a configuration in which individual databases require a separate interface. The configuration according to the present embodiment is particularly useful in a case where data copy processing occurs not so often between the master DB and copy DB, and in a case where a plurality of processings need not be executed in parallel.

Fourth Embodiment

Figure 12:
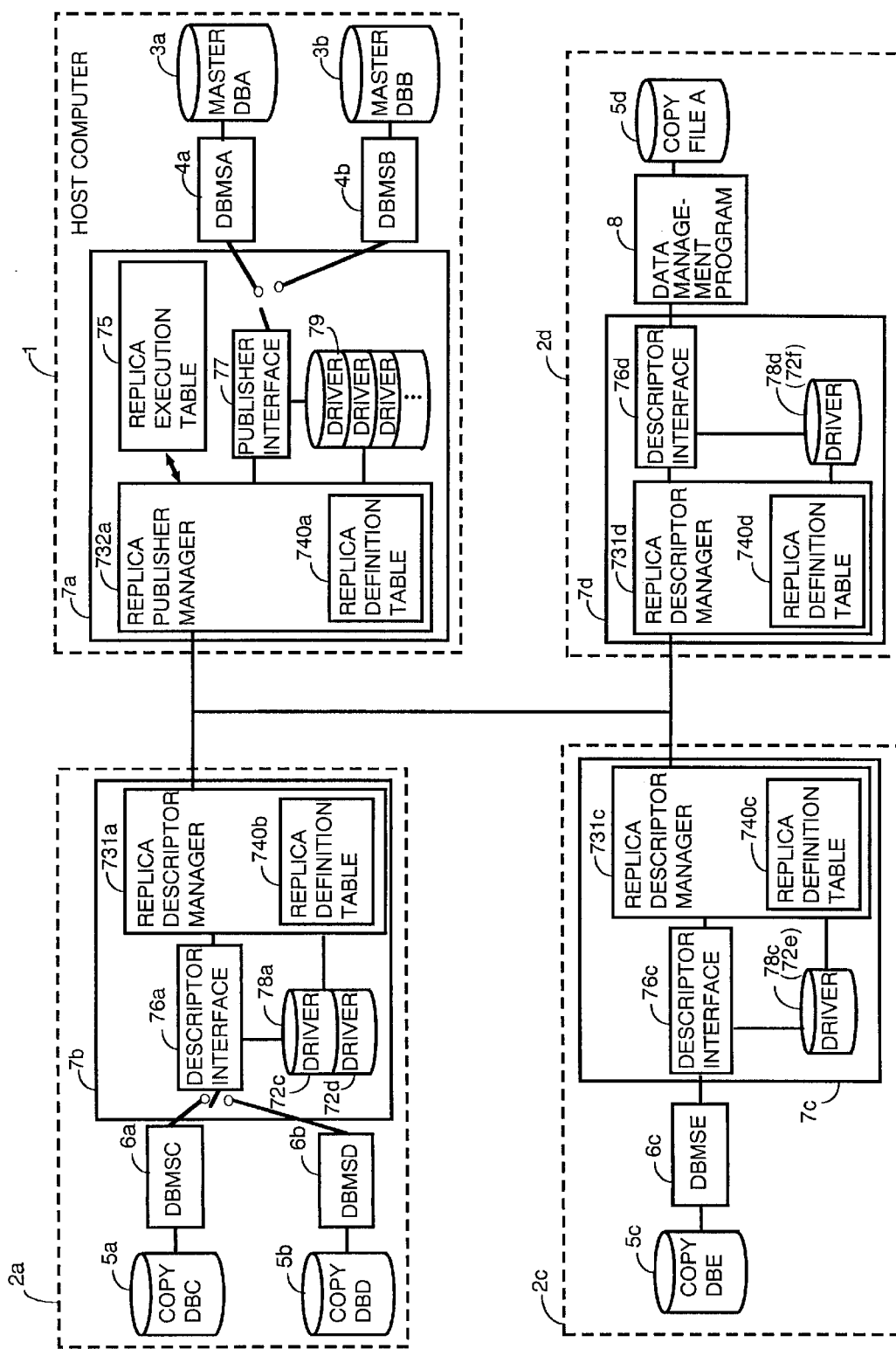
FIG. 12 is a block diagram illustrating a replica system according to a fourth embodiment of the invention.

FIG. 12 is a block diagram which shows a construction of a replica system according to a fourth embodiment of the present invention. The system of FIG. 12 has a construction in which portions of the replica manager of the system according to the third embodiment are deployed on the distributed computers.

In FIG. 12, replica descriptor managers 731a, 731c and 731d are respectively located on the distributed computers 2a, 2c and 2d. Replica publisher manager 732a is located on the host computer 1. Descriptor interfaces 76a, 76c and 76d are allocated on the distributed computers 2a, 2c and 2d, respectively. The replica publisher manager 732a has a replica definition table 740a, and the replica descriptor managers 731a, 731c and 731d have replica definition tables 740b, 740c and 740d, respectively.

Patterns registered in the replica definition tables 740b, 740c and 740d are merely associated with DBs or files located in respective computers. More specifically, with respect to the replica definition table 740a obtained by the replica publisher manager 732a, tables and files registered in the column for table/file names, which is one of the columns associated with the column indicative of the copy side, are those executed by the distributed computers.

The descriptor driver storage disks 78a, 78c and 78d are respectively located in the distributed computers 2a, 2c and 2d. Among these disks, the descriptor driver storage disk 78a stores two drivers, i.e., the descriptor driver for DBMS C 72c and the descriptor driver for DBMS D 72d for exchanging data with DBMS C 6a and DBMS D 6b. The descriptor driver storage disk 78c stores only the descriptor driver for DBMS E 72e for exchanging data with DBMS E 6c. The descriptor driver storage disk 78d stores only the descriptor driver for copy file A 72f for exchanging data with the copy file A 5d.

With this configuration, the system according to the present embodiment is appropriately capable of distributing a load on the host computer, thus preventing the operation of a program from being delayed on the host computer.

Fifth Embodiment

Figure 13:
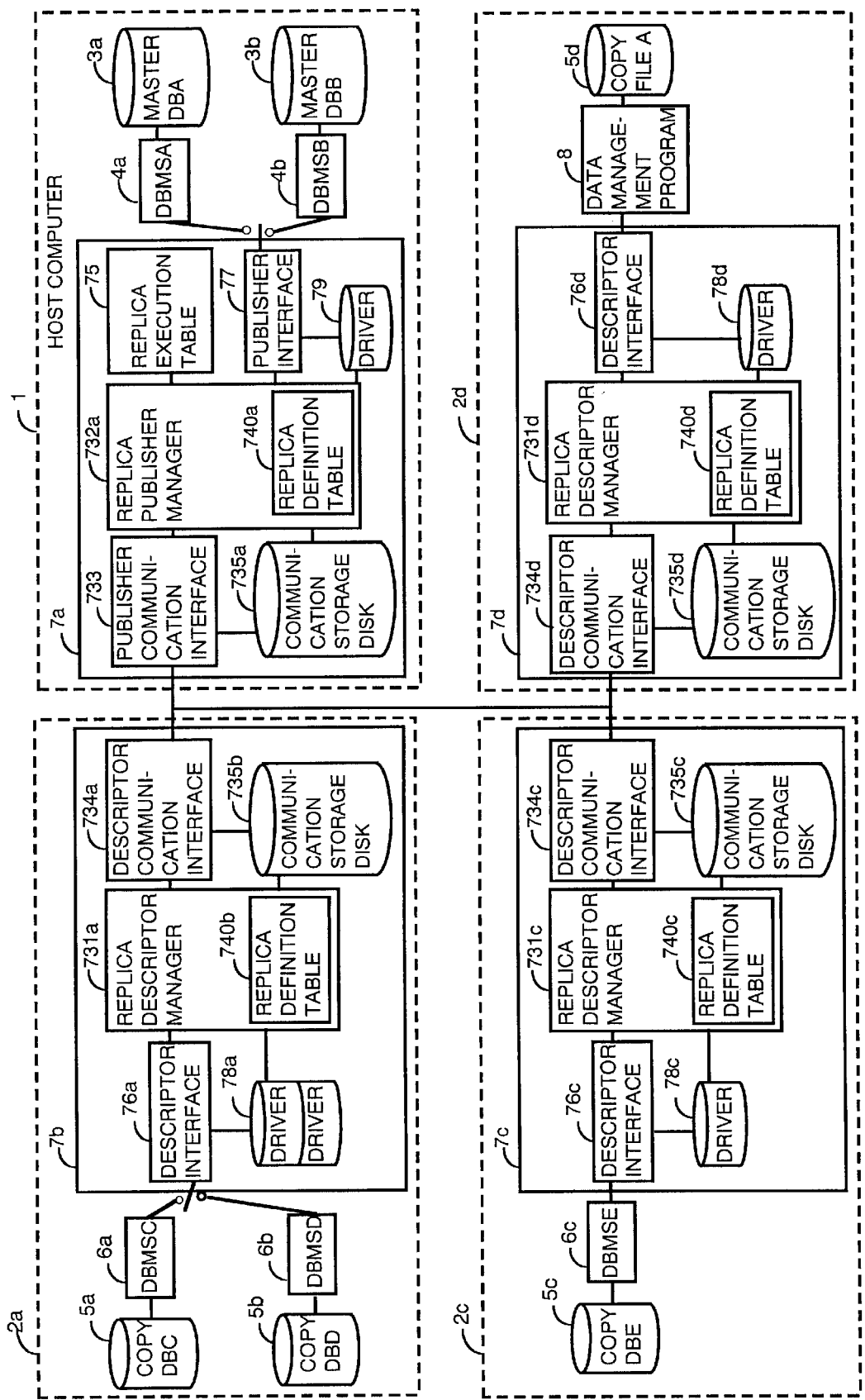
FIG. 13 is a block diagram illustrating a replica system according to a fifth embodiment of the invention.

FIG. 13 shows a construction of a replica system according to a fifth embodiment of the present invention. The system shown in FIG. 13 has a construction which enables the replica controllers to control connection/disconnection of communications between the host computer and the distributed computers.

In FIG. 13, a publisher communication interface 733 acts as a communication interface means on the host computer 1. Likewise, descriptor communication interfaces 734a, 734c and 734d respectively act as a communication interface means on the distributed computers 2a, 2c and 2d.

Communication storage disk 735a functions as a communication information storage means on the host computer 1, in which communication information, such as a correspondence between each descriptor driver and its descriptor communication interface, is stored. Communication storage disks 735b, 735c and 735d respectively 710 act as a communication information storage means on the distributed computers 2a, 2c and 2d, and these disks store communication information such as a correspondence between each publisher driver and a publisher communication interface on which the driver resides.

FIG. 14 conceptually illustrates communication information stored in the communication storage disk 735a. In FIG. 14, a column 401 is a column for names of the descriptor driver, 402, a column for communication addresses of the descriptor communication driver corresponding to the descriptor driver, 403, a column for authentication, and 404, a column for optional data.

Note that the communication addresses are equivalent, for example, to a telephone number assigned to each interface in a case where the connection is made via a telephone line, and to IP addresses assigned to each interface in a case where the connection is established via a LAN. Authentication is a password required for passing through a line.

Column for optional data 404 consists of a column for compression selection 404a and a column for encoding (encryption) selection 404b. If the column has a mark, either compression or encoding, or both are performed accordingly.

In the present embodiment, the descriptor communication interface 734a has an address of "A". Similarly, the descriptor communication interface 734c has "C", and the descriptor communication interface 734d has "D" as an address.

FIG. 15 is a table showing communication information stored in the communication storage disk 735b, FIG. 16, a table illustrating communication information stored in the communication storage disk 735c, and FIG. 17, a table for communication information stored in the communication storage disk 735d. In FIGS. 15, 16 and 17, the publisher communication interface 733 is addressed with "M".

Figure 18:
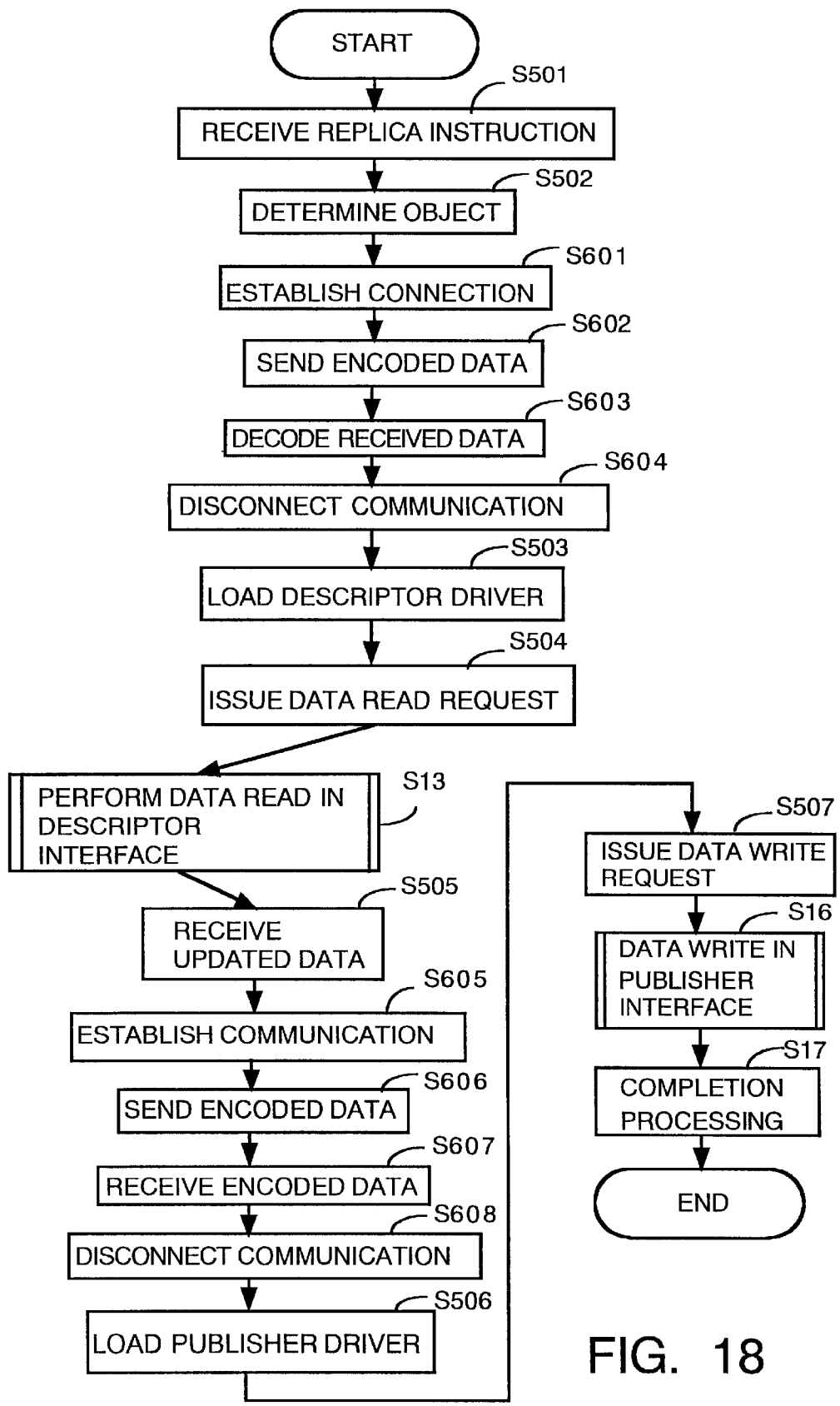
FIG. 18 is a flowchart of the operation of copying updated data of the copy DB on a distributed computer to the master DB.
Figure 19:
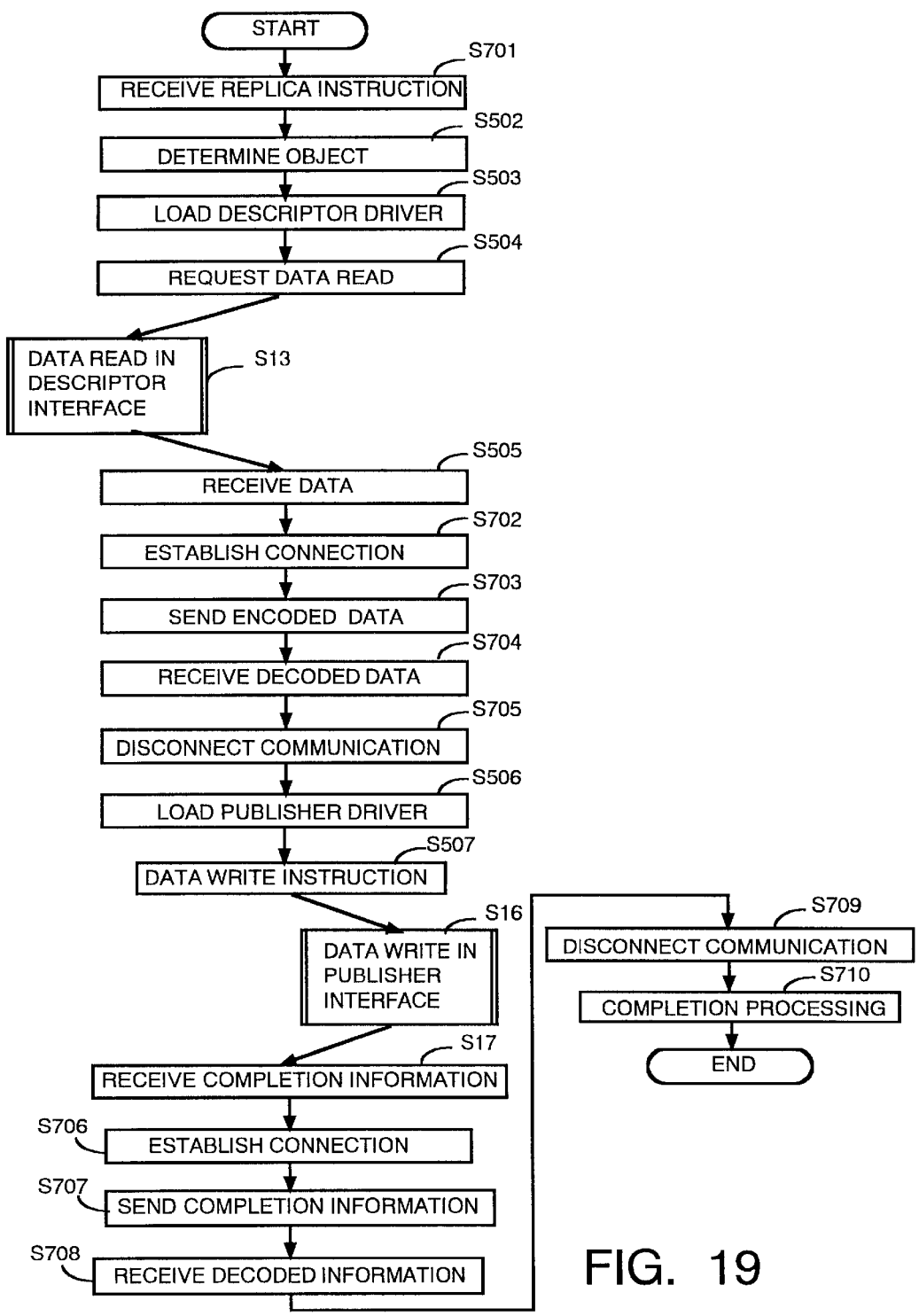
FIG. 19 is a flowchart showing the operation of copying updated data of the copy DB on the distributed computer to the master DB.
Figure 20:
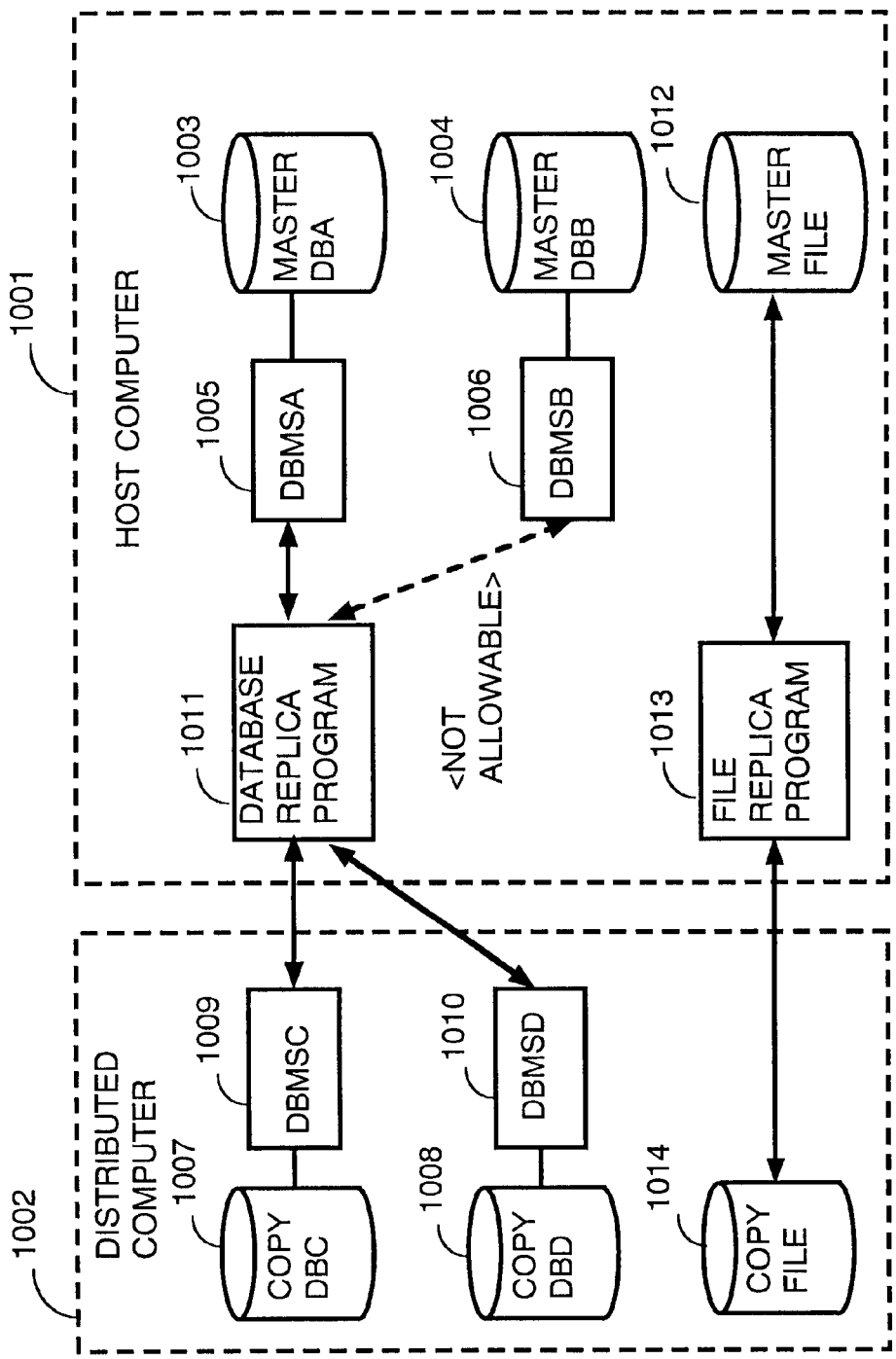
FIG. 20 is a block diagram of an existing replica system.

Following is the operation to copy to the master DB A 3a updated data of the copy DB C 5a on the distributed computer 2a, which is described in flowcharts of FIGS. 18 and 19. FIG. 18 shows the case where the replica publisher manager 732a receives a copy instruction in accordance with the replica execution table, while FIG. 19 illustrates the case where the replica descriptor manager 731a receives the instruction with the aid of a key board operated by a sales person who owns the distributed computer.

The case where the replica publisher manager receives the copy request will now be described by referring to FIG. 18. In the first step, steps S501 and S502, which are the same as those shown in FIG. 11, are executed. The replica publisher manager 732a then retrieves contents of the communication storage disk 735a using the descriptor driver described in the replica pattern data, as a key to perform the retrieval, and detects information such as a corresponding address. This information is sent to the publisher communication interface 733 to request a connection with the addressee.

The publisher communication interface 733 makes use of this address to establish a connection with the descriptor communication interface 734a on the distributed computer 2a (step S601). Establishment of this connection includes authentication processing, for which authorization "AA", stored in the column for authentication 403, is used.

The replica publisher manager 732a receives from the publisher communication interface 733 information concerning the establishment of the connection, and sends replica pattern data and a data read request to the publisher communication interface 733. The publisher communication interface 733 then encodes and encrypts the received data, and sends them to the descriptor communication interface 734a (step S602). The descriptor communication interface 734a subsequently decrypts or decodes the received data for the replica descriptor manager 731a to receive the replica pattern data and data read request (step S603).

If the replica descriptor manager 731a successfully receives these pattern data and request, it sends a request for disconnection to the descriptor communication interface 734a. The interface then deactivates the connection or communication.

Figure 11:
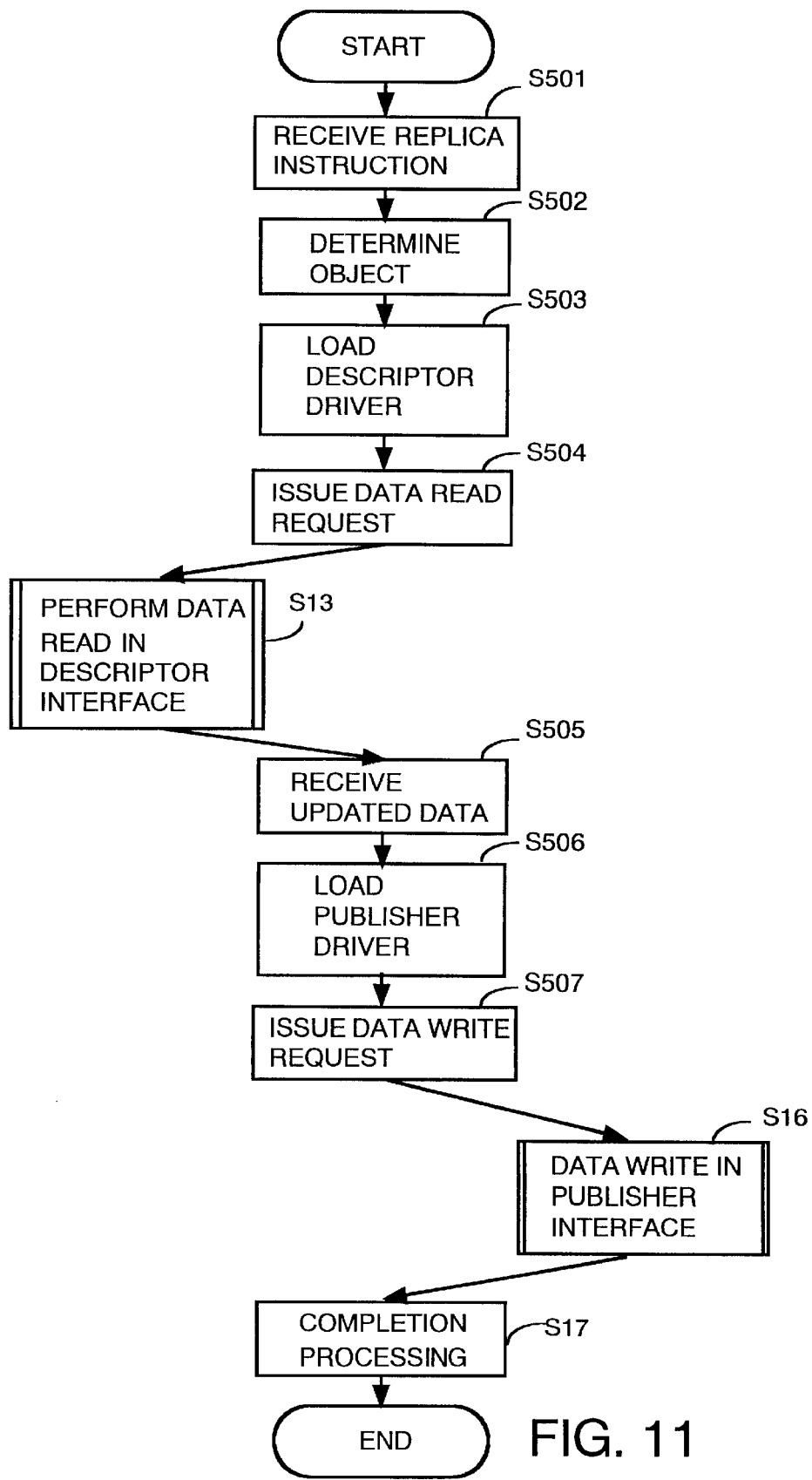
FIG. 11 is a flowchart with respect to a copy of updated data from the copy DB to the master DB.

On the side of the distributed computer 2a, steps S502, S503, S13 and S505 are performed as described in FIG. 11, and the replica descriptor manager 731a receives updated data.

The replica descriptor manager 731a retrieves the communication storage disk 735b using a publisher driver as a key described in the replica pattern data, thus detecting information such as a corresponding address. The manager then sends the information to the descriptor communication interface 734a to request a connection with the addressee. The descriptor communication interface 734a establishes a connection with the publisher communication interface 733 on the host computer 1 using this communication address (step S605).

The replica descriptor manager 731a receives from the descriptor communication interface 734a information concerning establishment of connection, and sends updated data to that interface 734a. The interface 734a encodes and encrypts the received data, and sends the data to the publisher communication interface 733 (step S606). Upon reception of the data, the interface 733 decodes the received data, and sends it to the replica publisher manager 732a (step S607). If the replica publisher manager 732a successfully receives the updated data, a request for disconnection is sent to the publisher communication interface 733 so that the communication is disconnected (step S608).

On the side of the host computer 1, steps S506, S507 and S16 are processed as shown in FIG. 11, resulting in reflection of the updated data on the master DB A 3a. Then, in a step S17, the fact that all of the steps have successfully been completed is displayed on a console or the like.

Referring now to FIG. 19, the case where the replica descriptor manager receives a request will be described below. In the first step, the replica descriptor manager 731 a receives a replica instruction designating a pattern number associated with a copy from the copy DB to the master DB A 3a input via a key board (step S701). After the reception, steps S502, S503, S504, S13 and S505 are executed in a similar manner as shown in FIG. 11, and the replica descriptor manager 731a receives updated data.

The replica descriptor manager 731a retrieves the communication storage disk 735b using a publisher driver as a key described in the replica pattern data, so as to detect information, such as a corresponding address. The information is then sent to the descriptor communication interface 734a to request a connection with the addressee. The descriptor communication interface 734a establishes a connection with the publisher communication interface 733 on the host computer 1 using this address (step S702).

The replica descriptor manager 731a receives from the descriptor communication interface 734a information concerning the establishment of the connection, and sends updated data and replica pattern data to the descriptor communication interface 734a. The interface 734a then encodes and encrypts the received data, and sends it to the publisher communication interface 733 (step S703). The publisher communication interface 733 receives and decodes the updated data and replica pattern data, for the replica publisher manager 732a to receive these data (step S704).

If the replica publisher manager 732a successfully receives these updated data and replica pattern data, the manager requests the publisher communication interface 733 to deactivate the connection, thus resulting in disconnection of communication (step S705).

On the side of the host computer 1, steps S506, S507 and S16 are executed in a similar manner as described in FIG. 11, and as a result, the updated data is reflected on the master DB A 3a. In step S17, the replica publisher manager 732a receives completion information.

The replica publisher manager 732a retrieves the communication storage disk 735a using a descriptor driver as a key described in the replica pattern data, in order to detect information such as a corresponding address. The information is sent to the publisher communication interface 733 to request a connection with the addressee. The publisher communication interface 733 consequently establishes a connection with the descriptor communication interface 734a on the distributed computer 2a using this address (step S706).

The replica publisher manager 732a receives from the publisher communication interface 733 information concerning the establishment of the connection, and sends the completion information to the publisher communication interface 733. The interface 733 encodes and encrypts the completion information, and sends it to the descriptor communication interface 734a (step S707). The descriptor communication interface 734a receives and decodes the completion information, so that the replica descriptor manager 731a receives that information (step S708). Note that if the replica descriptor manager 731a successfully receives the completion information, it requests the descriptor communication interface 734a to deactivate the connection, thus disconnecting communication (step S709).

On the side of the distributed computer 2a, the replica descriptor manager 731a informs the user of successful completion, by for example, displaying it on a display and the like (step S710).

In the above description, the processing is focused on copying of the updated data from the copy DB to the master DB. The same is true of the case where copying of data is performed from the master DB to the copy DB. In this copy processing, a connection is established between the publisher communication interface of the host computer and the descriptor interface of the distributed computer, only when transmitting data and a command.

As mentioned above, the replica publisher manager and the replica descriptor manager are connected only when they exchange data or a command. This requires no connection between these managers when the manager is, for example, writing/reading data to and from the master DB or copy DB. Accordingly, communication cost is remarkably reduced.

Since connection between the host computer and the distributed computer is established in the replica processing, it is not necessary for the user to manually execute laborious connection processing before the replica processing. Furthermore, even if the user does not know how to perform connection processing, he or she can carry out the replica processing.

According to the present embodiment, encryption or compression can be set up to perform for each replica process. It is therefore possible to provide a carefully managed data transmission just suited for each replica processing, by taking into account the importance of or needs of communication, charge for a line, functions of an addressee's communication driver and the like.

In the present embodiment as described above, communication drivers are located in the publisher communication interface and descriptor communication interface. However, a disk may be provided on which these drivers are arranged and a necessary one is read out at each time of connection. In such an arrangement, the name of communication drivers necessary for each address of addressees are set in the communication storage disk, and the drivers are stored in that disk.

By adopting this expedient, a communication interface needs not to have a plurality of communication drivers in advance, thus making the whole arrangement simpler.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A replica system having:
   a first database;
   first data management means for managing the first database;
   a second database;
   second data management means for managing the second database; and
   a replica controller for producing replicas of data between said first and second databases, said replica controller comprising:

replica management means for receiving a replica instruction, and, according to the replica instruction, determining an object to be read from one of said first and second databases and an object to be written in the one of said first and second databases from which the object is not read;

first interface means, giving a command to said first data management means when the object is to be read from said first database, for reading from said first database data associated with the object to be read, and converting format of the data read into a standardized data format specified in said system, and for, when the object is to be written into said first database, converting the format of data to be written into said first database from the standardized data format specified in said system into the data format associated with the object to be written into said first database, and writing the data in the converted format into said first database by giving a command to said first data management means; and second interface means for, when the object is to be written into said second database, receiving data in the standardized data format from said first interface means, converting the format of the data into a data format associated with the object to be written into said second database, and writing the data in the converted format into said second database by giving a command to said second data management means, and, when the object is to be read from the second database, giving a command to said second data management means for reading from said second database data associated with said object to be read, and converting the format of the data read from said second database into the standardized data format specified in said system.

2. The replica system according to claim 1, wherein said replica management means has replica pattern storage means for storing replica pattern data with information concerning the object to be read and the object to be written.

3. The replica system according to claim 2, wherein the replica pattern data includes code conversion information.

4. The replica system according to claim 3, further comprising replica instruction storage means in which the replica instruction is stored, wherein said replica management means reads the replica instruction from said replica instruction storage means.

5. The replica system according to claim 4, wherein each of said first interface means and second interface means has an interchangeable interface driver.

6. The replica system according to claim 5, wherein said replica management means has first replica distribution management means for sending data to and receiving data from said first interface means, and has second replica distribution management means for sending data to and receiving data from said second interface means.

7. The replica system according to claim 6, wherein said first interface means and said first replica distribution management means are part of a first computer, and said second interface means and said second replica distribution management means are part of a second computer, said first computer and said second computer being connectable via a communication medium.

8. The replica system according to claim 7, wherein said first computer has first communication interface means for managing communication, and said second computer has second communication interface means for managing communication, whereby said first communication interface means may be connected to said second communication interface means in accordance with an instruction sent from said first replica distribution management means, and said second communication interface means may be connected to said first communication interface means in accordance with an instruction sent from said second replica distribution management means.

9. The replica system according to claim 8, wherein said first computer has first communication information storage means for storing communication information used for communication with said second computer, and said second computer has second communication information storage means for storing communication information used for communication with said first computer.

10. The replica system according to claim 9, wherein the communication information is a communication address.

11. A method of producing a replica in a system having a first database managed by first data management means and a second database managed by second data management means, the method comprising:

receiving a replica instruction;

determining, according to the replica instruction, an object to be read from one of said first and second databases and an object to be written into the one of said first and second databases from which the object is not read;

reading from one of said first and second databases data associated with the object to be read, by giving a command to the one of said first and second data management means associated with the one of said first and second databases from which the object is to be read;

converting the data read from one of said first and second databases into a standardized data format specified in said system;

converting the data in the standardized data format into data in a format associated with the object to be written in the one of said first and second databases from which the object was not read; and writing the data in the format associated with the object to be written into the one of said first and second databases from which the object was not read, by giving a command to the one of said first and second data management means into which the object is written.

* * * * *